US010364750B2

(12) United States Patent
Rambo

(10) Patent No.: US 10,364,750 B2
(45) Date of Patent: Jul. 30, 2019

(54) THERMAL MANAGEMENT SYSTEM

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 15/796,991

(22) Filed: Oct. 30, 2017

(65) Prior Publication Data

US 2019/0128189 A1 May 2, 2019

(51) Int. Cl.
*F02C 7/18* (2006.01)
*F02K 3/06* (2006.01)
*F01D 17/16* (2006.01)
*F02C 7/14* (2006.01)

(52) U.S. Cl.
CPC ............ *F02C 7/185* (2013.01); *F01D 17/162* (2013.01); *F02C 7/14* (2013.01); *F02K 3/06* (2013.01); *F05D 2220/323* (2013.01); *F05D 2240/12* (2013.01); *F05D 2260/213* (2013.01)

(58) Field of Classification Search
CPC .... F02C 7/18; F02C 7/185; F02C 7/14; F01D 17/162; F02K 3/05; F05D 2220/323; F05D 2240/12; F05D 2260/213
See application file for complete search history.

(56) References Cited

U.S. PATENT DOCUMENTS

| 6,106,229 | A | 8/2000 | Nikkanen et al. |
|---|---|---|---|
| 7,681,339 | B2 | 3/2010 | Orlando et al. |
| 7,946,806 | B2 | 5/2011 | Murphy |
| 8,205,426 | B2 | 6/2012 | Schilling |
| 8,266,888 | B2 | 9/2012 | Liu |
| 8,438,835 | B2 | 5/2013 | Perveiler et al. |
| 8,490,382 | B2 | 7/2013 | Zysman et al. |
| 8,756,910 | B2 | 6/2014 | Donovan et al. |
| 8,763,363 | B2 | 7/2014 | Ranganathan |
| 8,776,952 | B2 | 7/2014 | Schwarz et al. |
| 8,961,114 | B2 | 2/2015 | Ruthemeyer |
| 9,115,593 | B2 * | 8/2015 | Suciu ...................... F02C 7/047 |

(Continued)

FOREIGN PATENT DOCUMENTS

WO    WO2014/051678 A1    4/2014

*Primary Examiner* — Hieu T Vo
(74) *Attorney, Agent, or Firm* — Dority & Manning, P.A.

(57) ABSTRACT

A gas turbine engine includes an outer nacelle; a fan at least partially surrounded by the outer nacelle; and a turbomachine drivingly coupled to the fan and at least partially surrounded by the outer nacelle. The outer nacelle defines a bypass airflow passage with the turbomachine. The turbomachine includes a compressor section defining in part a core air flowpath. The turbomachine also includes a heat sink heat exchanger; and a thermal management duct assembly defining a thermal management duct flowpath extending between an inlet and an outlet and positioned between the core air flowpath and the bypass airflow passage along the radial direction, the outlet selectively in airflow communication with a core compartment of the turbomachine, and the heat sink heat exchanger positioned in thermal communication with the thermal management duct flowpath for transferring heat to an airflow through the thermal management duct flowpath during operation.

20 Claims, 8 Drawing Sheets

(56) References Cited

U.S. PATENT DOCUMENTS

| | | |
|---|---|---|
| 9,212,623 B2 | 12/2015 | Murphy et al. |
| 9,243,563 B2 | 1/2016 | Lo |
| 9,410,482 B2 | 8/2016 | Krautheim et al. |
| 9,587,561 B2 | 3/2017 | Snyder et al. |
| 2011/0171007 A1 | 7/2011 | Johnson et al. |
| 2012/0128467 A1 | 5/2012 | Ruthemeyer |
| 2014/0345254 A1 | 11/2014 | Dawson et al. |
| 2016/0312702 A1 | 10/2016 | Thomas |
| 2016/0369706 A1 | 12/2016 | Suciu et al. |
| 2017/0204807 A1 | 7/2017 | Chillapalli et al. |
| 2017/0267360 A1* | 9/2017 | Heid .................. B64D 15/04 |
| 2018/0038280 A1* | 2/2018 | Rogero ................ B64D 15/02 |

* cited by examiner

US 10,364,750 B2

THERMAL MANAGEMENT SYSTEM

FIELD

The present subject matter relates generally to a thermal management system, and more specifically to a gas turbine engine having a separate flowpath for heat rejection.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, various systems may generate a relatively large amount of heat. Thermal management systems of the gas turbine engine may collect heat from one or more of these systems to maintain a temperature of such systems within an acceptable operating range. The thermal management systems may reject such heat through one or more heat exchangers. In at least certain embodiments, at least one of these heat exchangers may be integrated into one or more components exposed to the bypass airflow passage, such as one or more of the struts extending between the turbomachine and the outer nacelle.

However, inclusion of one or more heat exchangers integrated into one or more components exposed to the bypass airflow passage may have an adverse effect on an airflow through the bypass airflow passage. Accordingly, a thermal management system capable of rejecting heat from various components of the gas turbine engine without adversely affecting the airflow through the bypass airflow passage would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining a radial direction is provided. The gas turbine engine includes an outer nacelle; a fan at least partially surrounded by the outer nacelle; and a turbomachine drivingly coupled to the fan and at least partially surrounded by the outer nacelle. The outer nacelle defines a bypass airflow passage with the turbomachine. The turbomachine includes a compressor section defining in part a core air flowpath, the turbomachine further defining a core compartment outward of the core air flowpath along the radial direction. The turbomachine also includes a heat sink heat exchanger; and a thermal management duct assembly defining a thermal management duct flowpath extending between an inlet and an outlet and positioned between the core air flowpath and the bypass airflow passage along the radial direction, the outlet selectively in airflow communication with the core compartment, and the heat sink heat exchanger positioned in thermal communication with the thermal management duct flowpath for transferring heat to an airflow through the thermal management duct flowpath during operation.

In certain exemplary embodiments the compressor section of the turbomachine includes a compressor, wherein the inlet of the thermal management duct flowpath is in airflow communication with the core air flowpath at a location upstream of the compressor.

For example, in certain exemplary embodiments the compressor is a low pressure compressor, wherein the compressor section further includes a high pressure compressor, and wherein the core compartment surrounds at least a portion of the high pressure compressor.

In certain exemplary embodiments the compressor section of the turbomachine includes a compressor having a stage of compressor rotor blades, and wherein the thermal management duct assembly includes an auxiliary fan driven by the stage of compressor rotor blades of the compressor.

For example, in certain exemplary embodiments the auxiliary fan of the thermal management duct assembly is positioned outward of the stage of compressor rotor blades of the compressor along the radial direction.

In certain exemplary embodiments the thermal management duct assembly further includes a stage of variable guide vanes positioned within the thermal management duct flowpath.

For example, in certain exemplary embodiments the stage of variable guide vanes is movable between an open position and a closed position.

In certain exemplary embodiments the outlet of the thermal management duct flowpath is a first outlet, wherein the thermal management duct flowpath further includes a second outlet selectively in airflow communication with the bypass airflow passage.

For example, in certain exemplary embodiments the thermal management duct assembly further includes a variable component movable between a first position and a second position, wherein the thermal management duct flowpath is in airflow communication with the core compartment through the first outlet when the variable component is in the first position, and wherein the thermal management duct flowpath is in airflow communication with the bypass airflow passage through the second outlet when the variable component is in the second position.

For example, in certain exemplary embodiments the gas turbine engine further defines an axial direction, and wherein the variable component is movable generally along the axial direction between the first position and the second position.

For example, in certain exemplary embodiments substantially all of an airflow through the thermal management duct flowpath is configured to exit through the first outlet when the variable component is in the first position, and wherein substantially all of the airflow through the thermal management duct flowpath is configured to exit through the second outlet when the variable component is in the second position.

In certain exemplary embodiments the gas turbine engine further includes a cooled cooling air system; an auxiliary system; an environmental control system; and a lubrication system. The heat sink heat exchanger is in thermal communication with at least one of the cooled cooling air system, the auxiliary system, the environmental control system, or the lubrication system through the thermal management system.

In certain exemplary embodiments the gas turbine engine is a high-bypass turbofan engine defining a bypass ratio greater than about 6:1 and up to about 30:1.

The gas turbine engine of claim 1, wherein the thermal management duct flowpath is a substantially annular flowpath positioned outward of the core air flowpath along the radial direction.

In certain exemplary embodiments the turbomachine defines a ratio of airflow through the thermal management duct flowpath to airflow through the core air flowpath between about 0.01:1 and 0.4:1.

In an exemplary aspect of the present disclosure, a method is provided for operating a gas turbine engine having a fan, a turbomachine, and an outer nacelle defining a bypass airflow passage with the turbomachine. The turbomachine defines a core compartment and includes a heat sink heat exchanger and a thermal management duct assembly, the thermal management duct assembly defining a thermal management duct flowpath, the heat sink heat exchanger in thermal communication with the thermal management duct flowpath. The method includes providing an airflow through the thermal management duct flowpath and over the heat sink heat exchanger; determining the gas turbine engine is operating in a first operating condition; moving a variable component of the thermal management duct assembly to direct substantially all of the airflow through thermal management duct flowpath to the core compartment; determining the gas turbine engine is operating in a second operating condition; and moving the variable component of the thermal management duct assembly to direct substantially a predetermined amount of the airflow through the thermal management duct flowpath to the bypass airflow passage.

In certain exemplary aspects the first operating condition is a high power operating condition.

For example, in certain exemplary aspects the second operating condition is a low power operating condition.

In certain exemplary aspects the compressor section of the turbomachine comprises a compressor, wherein the inlet of the thermal management duct flowpath is in airflow communication with the core air flowpath at a location upstream of the compressor.

In certain exemplary aspects the thermal management duct flowpath is a substantially annular flowpath positioned outward of the core air flowpath along the radial direction and inward of the bypass airflow passage along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
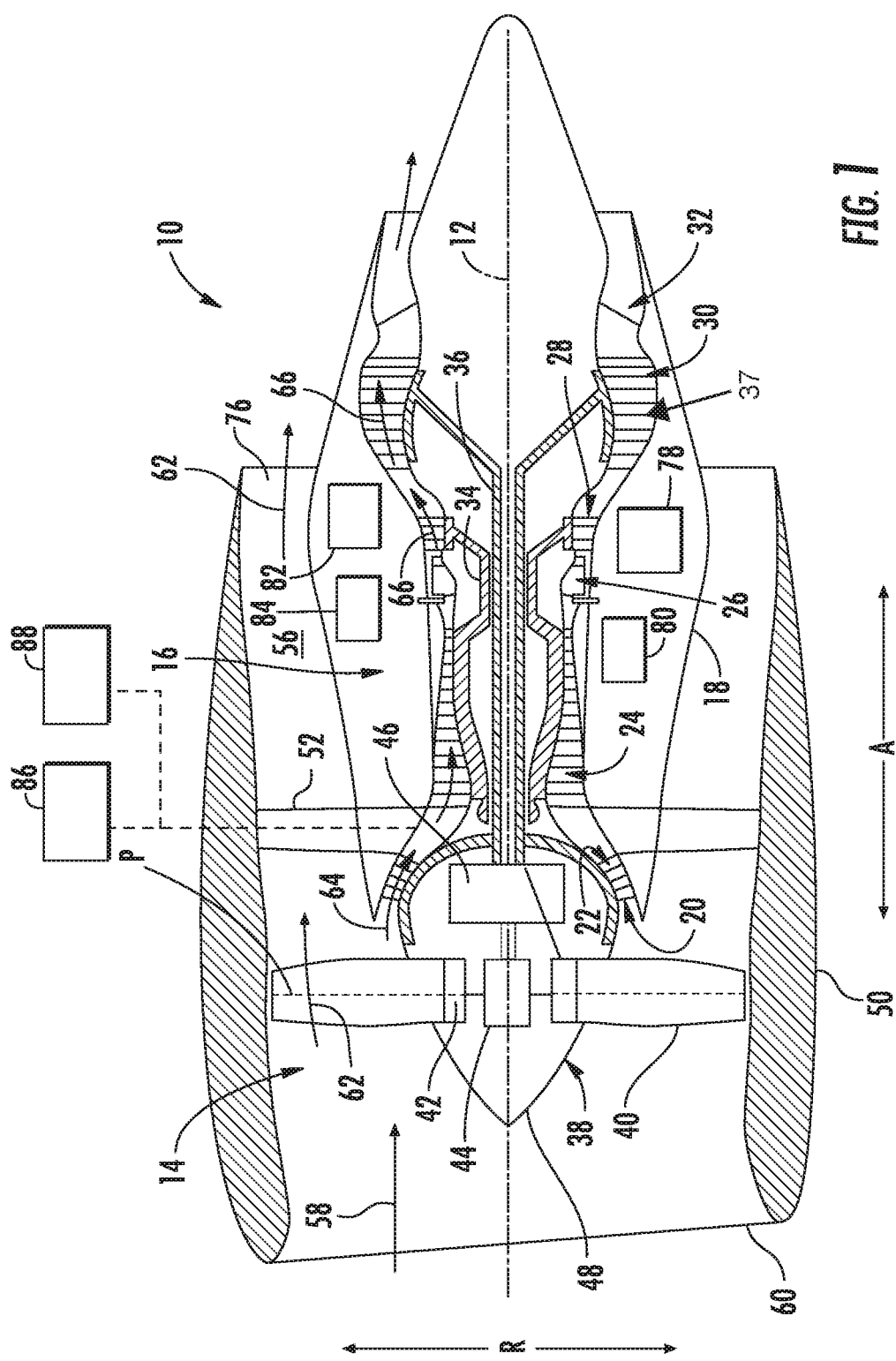
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. As stated, for the embodiment shown, the turbofan engine 10 is a high bypass turbofan engine 10. Accordingly, for the embodiment depicted, the bypass ratio defined by the turbofan engine 10 is greater than about 6:1 and up to about 30:1.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Figure 3:
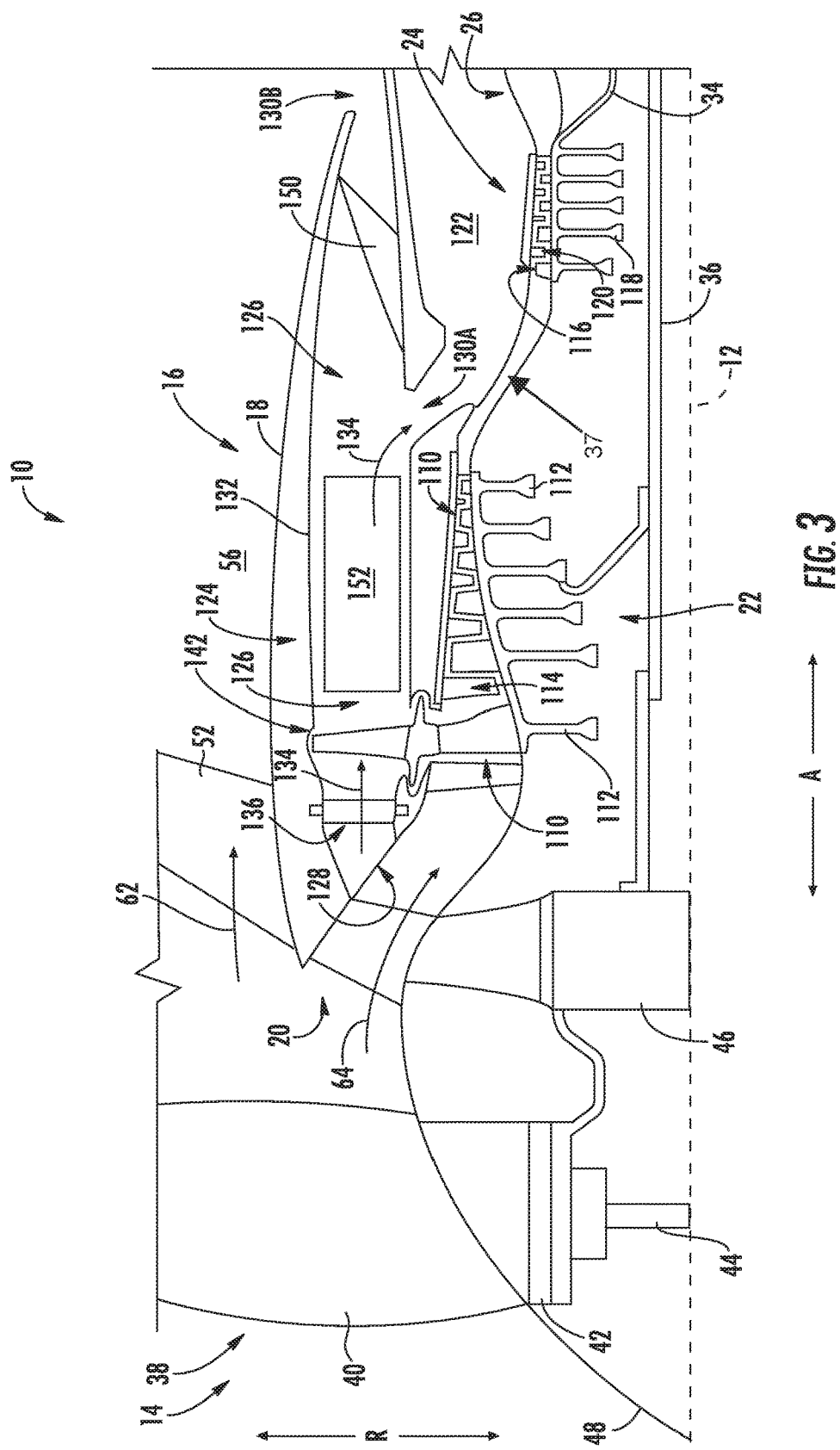
FIG. 3 is a schematic, cross-sectional view of a section of a gas turbine engine including a thermal management system in accordance with an exemplary embodiment of the present disclosure.

Moreover, as is depicted schematically, the exemplary turbofan engine 10 further includes various accessory systems to aid in the operation of the turbofan engine 10 and/or an aircraft including the turbofan engine 10 (e.g., FIG. 3). For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a cooled cooling air (CCA) system 80 (sometimes also referred to as a "compressor cooling air system") for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 depicted drives or enables various other accessory systems, e.g., for an aircraft (not shown) including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 and/or aircrafts included individual heat exchangers for each of these accessory systems to remove heat from air and/or lubrication in such systems. However, aspects of the present disclosure may include a thermal management system 100 (see FIG. 2) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems and may be configured in any other suitable manner. Additionally, or alternatively, the exemplary turbofan engine 10 may not include or be operably connected to one or more of the accessory systems discussed above.

Figure 2:
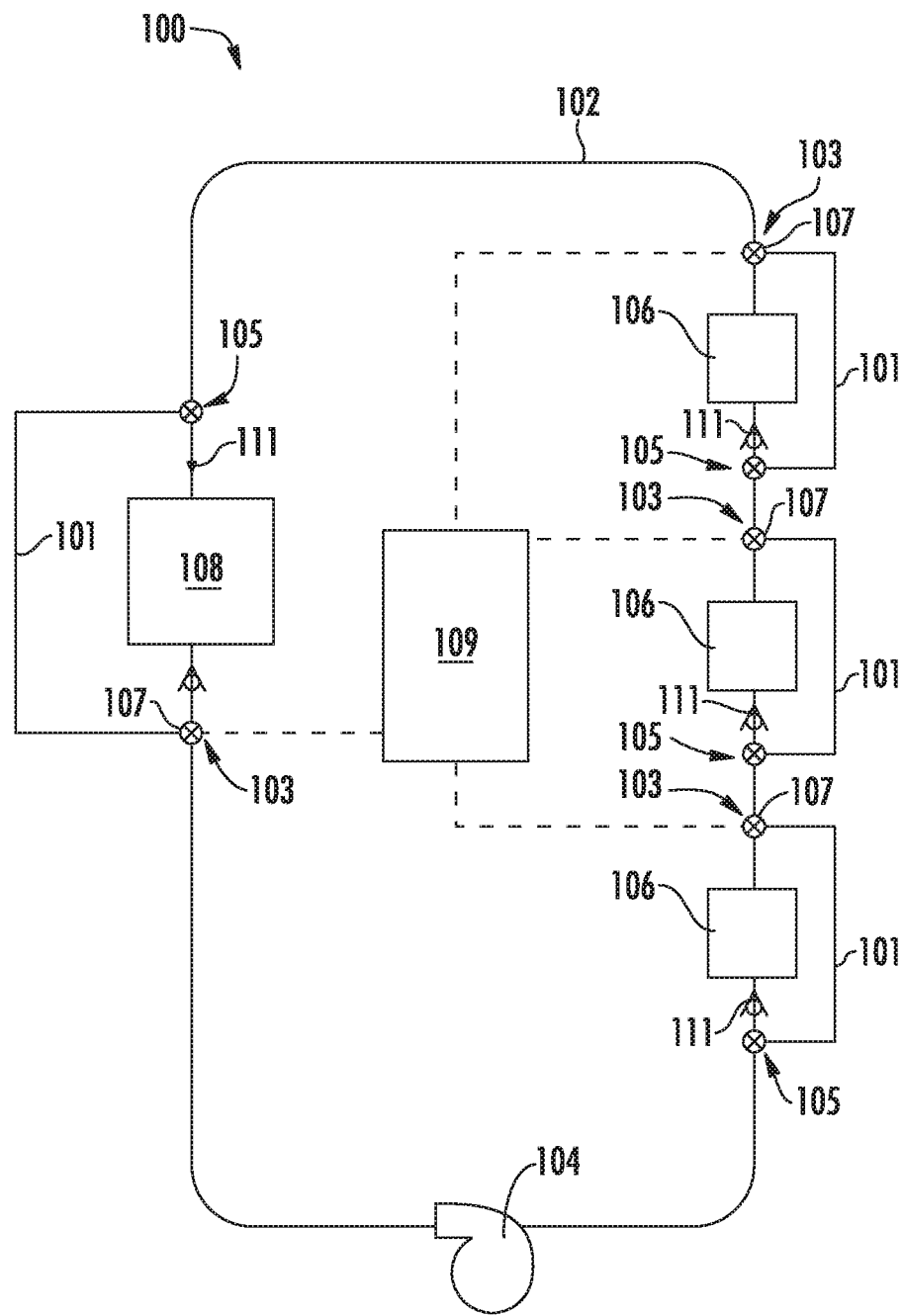
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into a gas turbine engine, such as the exemplary turbofan engine 10 of FIG. 1.

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may be an incompressible fluid having a high temperature operating range. For example, in certain embodiments, heat exchange fluid may be a water and ethanol mixture, or any suitable dielectric fluid. Additionally, or alternatively, however, the heat exchange fluid may be a gas, such as air extracted from the compressor, high-pressure carbon dioxide, or supercritical carbon dioxide. Additionally, or alternatively, still, the heat exchange fluid may be a combination of liquid and vapor, as in a vapor-compression refrigeration cycle.

A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine within which the system 100 is incorporated.

Moreover, the exemplary thermal management system 100 includes one or more heat source heat exchangers 106 in thermal communication with the heat exchange fluid in the thermal transport bus 102. Specifically, the thermal management system 100 depicted includes a plurality of heat source heat exchangers 106. The plurality of heat source heat exchangers 106 are configured to transfer heat from one or more of the accessory systems of the turbofan engine 10 (or operable with the turbofan engine 10) to the heat exchange fluid in the thermal transport bus 102. For example, in certain exemplary embodiments, the plurality of heat source heat exchangers 106 may include one or more of: a main lubrication system heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the generator lubrication system 84; an ECS heat exchanger for transferring heat from the ECS 86; an electronics cooling system heat exchanger for transferring heat from the electronics cooling system 88; a vapor compression system heat exchanger; an air cycle system heat exchanger; an auxiliary system(s) heat source exchanger; and a heat recovery heat exchanger positioned in, e.g., the turbine section or exhaust section for recovering heat from an airflow therethrough. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source heat exchangers 106, the three heat source heat exchangers 106 each arranged in series flow along the thermal transport bus 102. However, in other exemplary embodiments, any other suitable number of heat source heat exchangers 106 may be included and one or more of the heat source heat exchangers 106 may be arranged in parallel flow along the thermal transport bus 102. For example, in other embodiments, there may be a single heat source exchanger 106 in thermal communication with the heat exchange fluid in the thermal transport bus, or alternatively, there may be at least two heat source heat exchangers 106, at least four heat source heat exchangers 106, at least five heat source heat exchangers 106, or at least six heat source heat exchangers 106 in thermal communication with heat exchange fluid in the thermal transport bus 102.

Additionally, the exemplary thermal management system 100 of FIG. 2 further includes one or more heat sink heat exchanger 108 in thermal communication with the heat exchange fluid in the thermal transport bus 102. The one or more heat sink heat exchangers 108 are located downstream of the plurality of heat source heat exchangers 106 and are configured for removing heat from the heat exchange fluid in the thermal transport bus 102. More particularly, for the embodiment shown, the thermal management system 100 includes a single heat sink heat exchanger 108. As will be discussed below, the heat sink heat exchanger 108 may be positioned in a thermal management duct flowpath of a thermal management duct assembly of the gas turbine engine (see, e.g., FIG. 3).

It will be appreciated, however, that in other embodiments, the thermal management system 100 may include any other suitable number of heat sink heat exchangers, such as one or more of a RAM heat exchanger, a fuel heat exchanger, a fan stream heat exchanger, a bleed air heat exchanger, an engine intercooler heat exchanger, or a cold air output of an air cycle system heat exchanger in addition to the heat sink heat exchanger 108 depicted. More specifically, the RAM heat exchanger, if included, may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger, if included, may be a "fluid to heat exchange fluid" heat exchanger wherein heat from the heat exchange fluid is transferred to a stream of liquid fuel for the turbofan engine 10. Moreover, the fan stream heat exchanger, if included, may generally be an "air to heat exchange fluid" heat exchanger which flows, e.g., bypass air over heat exchange fluid to remove heat from the heat exchange fluid. Further, the bleed air heat exchanger, if included, may generally be an "air to heat exchange fluid" heat exchanger which flows, e.g., bleed air from the LP compressor over heat exchange fluid to remove heat from the heat exchange fluid.

Referring still to the exemplary embodiment depicted in FIG. 2, it will be appreciated that the heat sink exchanger 108 and plurality of heat source exchangers 106 are each selectively in thermal communication with the thermal transport bus 102 (and selectively in fluid communication with the heat exchange fluid in the thermal transport bus 102). More particularly, the thermal management system 100 depicted includes a plurality of bypass lines 101 for selectively bypassing the heat sink exchanger 108 and each the heat source exchanger 106 of the plurality of heat source heat exchangers 106. Each bypass line 101 extends between an upstream juncture 103 and a downstream juncture 105— the upstream juncture 103 located just upstream of a respective heat sink exchanger 108 or heat source heat exchanger 106, and the downstream juncture 105 located just downstream of the respective heat sink exchanger 108 or heat source heat exchanger 106. Additionally, each bypass line 101 meets at the respective upstream juncture 103 with the thermal transport bus 102 via a three-way heat sink valve 107. The three-way heat sink valves 107 each include an inlet fluidly connected with the thermal transport bus 102, a first outlet fluidly connected with the thermal transport bus 102, and a second outlet fluidly connected with the bypass line 101. The three-way heat sink valves 107 may each be a variable throughput three-way valve, such that the three-way heat sink valves 107 may vary a throughput from the inlet to the first and/or second outlets. For example, the three-way heat sink valves 107 may be configured for providing anywhere between zero percent (0%) and one hundred percent (100%) of the heat exchange fluid from the inlet to the first outlet, and similarly, the three-way heat sink valves 107 may be configured for providing anywhere between zero percent (0%) and one hundred percent (100%) of the heat exchange fluid from the inlet to the second outlet.

Notably, the three-way heat sink valves 107 may be in operable communication with a controller 109 of the turbofan engine 10 and/or of an aircraft including the turbofan engine 10 through one or more wired or wireless communications busses (depicted in phantom). The controller 109 may bypass one or more of the one or more heat sink exchanger 108 and/or heat source exchangers 106 based on, e.g., an operating condition of the turbofan engine 10 and/or aircraft, a temperature of the heat exchange fluid, and/or any other suitable variables. Alternatively, the controller 109 may bypass one or more of the one or more heat sink exchanger 108 and/or heat source exchangers 106 based on a user input.

Further, each bypass line 101 also meets at the respective downstream juncture 105 with the thermal transport bus 102. Between each heat sink exchanger 108 and downstream juncture 105, the thermal transport bus 102 includes a check valve 111 for ensuring a proper flow direction of the heat exchange fluid. More particularly, the check valve 111 prevents a flow of heat exchange fluid from the downstream juncture 105 towards the respective heat sink exchanger 108.

Referring still to FIG. 2, the exemplary thermal management system 100 depicted is configured to use a single phase, incompressible thermal transport fluid. It should be appreciated, however, that in other embodiments, the thermal management system 100 may instead use a phase change fluid. With such an embodiment, the thermal management system 100 may include a compressor for compressing the heat exchange fluid in the thermal transport bus 102, and an expansion device for expanding the heat exchange fluid in the thermal transport bus 102.

Additionally, it should be appreciated that the thermal management system 100 is provided by way of example only and that in other exemplary embodiments the thermal management system 100 may be configured in any other suitable manner. For example, in other exemplary embodiments, the thermal management system 100 may include any other suitable number of heat source heat exchangers and/or heat sink heat exchangers. Further, in other embodiments, the thermal management system 100 may additionally, or alternatively, utilize any other suitable heat sink heat exchangers, and be operable with any other suitable system of the gas turbine engine to remove heat from subsystem of the gas turbine engine.

Moreover, it will be appreciated that although for the embodiment of FIG. 2, the thermal management system 100 is depicted as a "thermal bus" system including an intermediary thermal bus (i.e., bus 102) configured to transfer heat from one or more heat sources to one or more heat sinks using an intermediate fluid, in other embodiments, the thermal management system 100 may be configured in any other suitable manner. For example, in other embodiments, the thermal management system 100 may be configured to cool an airflow, such as an airflow for a cooled cooling air system (e.g., CCA system 80), and may flow such airflow directly to a heat sink heat exchanger for cooling. Other configurations are contemplated as well.

Referring now to FIG. 3, a close-up, cross-sectional view of a gas turbine engine including a thermal management system 100 in accordance with an exemplary aspect of the present disclosure is provided. The gas turbine engine may be configured in a similar manner to the exemplary turbofan engine 10 described above with reference to FIG. 1, and further, the thermal management system 100 may be configured in a similar manner to the exemplary thermal management system 100 described above with reference to FIG. 2. Accordingly, the same or similar numbers may refer to same or similar parts.

As is depicted, the exemplary gas turbine engine of FIG. 2 generally includes a fan 38 and a turbomachine 16 drivingly coupled to the fan 38. Although not depicted, it will be appreciated that the gas turbine engine further includes an outer nacelle 50, with the fan 38 at least partially surrounded by the outer nacelle 50, and further with the turbomachine 16 also at least partially surrounded by the outer nacelle 50 (see FIG. 1). Moreover, the outer nacelle 50 defines a bypass airflow passage 56 with the turbomachine 16 (i.e., between the outer nacelle 50 and the turbomachine 16) (see also FIG. 1), and more specifically, defines the bypass airflow passage 56 with an outer casing 18 of the turbomachine 16. In such a manner, the gas turbine engine may be referred to as a turbofan engine 10. Further, it will be appreciated from FIG. 3, and the discussion above with reference to FIG. 1, that the gas turbine engine may further define a relatively high bypass ratio, and therefore may be referred to as a high bypass, turbofan engine.

Referring still to FIG. 3, the exemplary turbomachine 16 depicted generally includes a compressor section defining at least in part a core air flowpath 37. Additionally, the compressor section generally includes a low pressure ("LP") compressor 22 and a high pressure ("HP") compressor 24. The LP compressor 22 is coupled to, and driven by, an LP spool 36. More specifically, the LP compressor 22 generally includes a plurality of stages 110 of LP compressor rotor blades, with each stage 110 of LP compressor rotor blades coupled to a respective rotor 112, and the plurality of rotors 112 coupled together and/or to the LP spool 36. Between adjacent stages 110 of LP compressor rotor blades, the LP compressor 22 further includes stages 114 of guide vanes, one or more of which may be variable guide vanes. Similarly, the HP compressor 24 is coupled to, and driven by, an HP spool 34. As with the LP compressor 22, the HP compressor 24 generally includes a plurality of stages 116 of HP compressor rotor blades, with each stage 116 of HP compressor rotor blades coupled to a respective rotor 118, and the plurality of rotors 118 coupled together and/or to the HP spool 34. Further, between adjacent stages 116 of HP compressor rotor blades, the HP compressor 24 further includes stages 120 of guide vanes, one or more of which may be variable guide vanes.

The turbomachine 16 further defines a core compartment 122 outward of the core air flowpath 37 along the radial direction R, and for the embodiment depicted, at least partially surrounding the HP compressor 24. As will be appreciated, during high power operations of the gas turbine engine, the core compartment 122 may be subjected to relatively high temperatures due to, e.g., the relatively high temperatures of the HP compressor 24 and/or combustion section 26. Accordingly, as will be discussed in more detail below, the gas turbine engine of FIG. 3 may be configured to provide cooling air to the core compartment 122 during certain of these high power operations. For example, in certain embodiments, the "high-power" operations of the gas turbine engine may include, e.g., takeoff and climb operations of the gas turbine engine.

Further, the exemplary gas turbine engine of FIG. 3, and more specifically, the turbomachine 16 of the gas turbine engine of FIG. 3, further includes a thermal management duct assembly 124. The thermal management duct assembly 124 defines a thermal management duct flowpath 126 extending between an inlet 128 and an outlet 130 (labeled as "130A" and "130B," discussed below), and positioned between the core air flowpath 37 and the bypass airflow passage 56 along the radial direction R. Accordingly, it will be appreciated that the thermal management duct flowpath 126 is located inward of the outer casing 18 of the turbomachine 16. For the embodiment depicted, the thermal management duct assembly 124 includes one or more internal casing members 132, with the one or more internal casing members 132 defining the thermal management duct flowpath 126. Notably, however, in other embodiments, the thermal management duct assembly 124 may include one or more other components defining the thermal management duct flowpath 126, and further, may be integrated with one or more other components of the turbomachine 16 to define the thermal management duct flowpath 126.

As stated, for the embodiment depicted, the thermal management duct flowpath 126 extends between the inlet 128 and the outlet 130. For the embodiment depicted, the inlet 128 is in airflow communication with the core air flowpath 37 at a location upstream of a compressor of the compressor section, and more specifically, upstream of the LP compressor 22 of the compressor section. In such a manner, the thermal management duct flowpath 126 may be configured to receive a flow of air 134 from the core air flowpath 37 at a location upstream of the compressor section, and more specifically, at a location upstream of the LP compressor 22 of the compressor section. However, in other embodiments, the inlet 128 of the thermal management duct flowpath 126 may additionally, or alternatively, be in airflow communication with the bypass airflow passage 56, e.g., at a location proximate an inlet 20 to the turbomachine 16 (i.e., the inlet 20 defined by the casing 18). For example, the inlet 128 of the thermal management duct flowpath 126 may be in airflow communication with the bypass airflow passage 56 at a location forward of the HP compressor 24 along the axial direction A, and more specifically, forward of the LP compressor 22 along the axial direction A.

The thermal management duct assembly 124 further includes a stage of variable guide vanes 136 positioned proximate the inlet 128 of the thermal management duct flowpath 126, and more specifically, positioned downstream of the inlet 128 and forward of the LP compressor 22 of the compressor section along the axial direction A. Notably, however, in other embodiments, the stage of variable guide vanes 136 may instead be positioned at any other suitable location.

Figure 4:
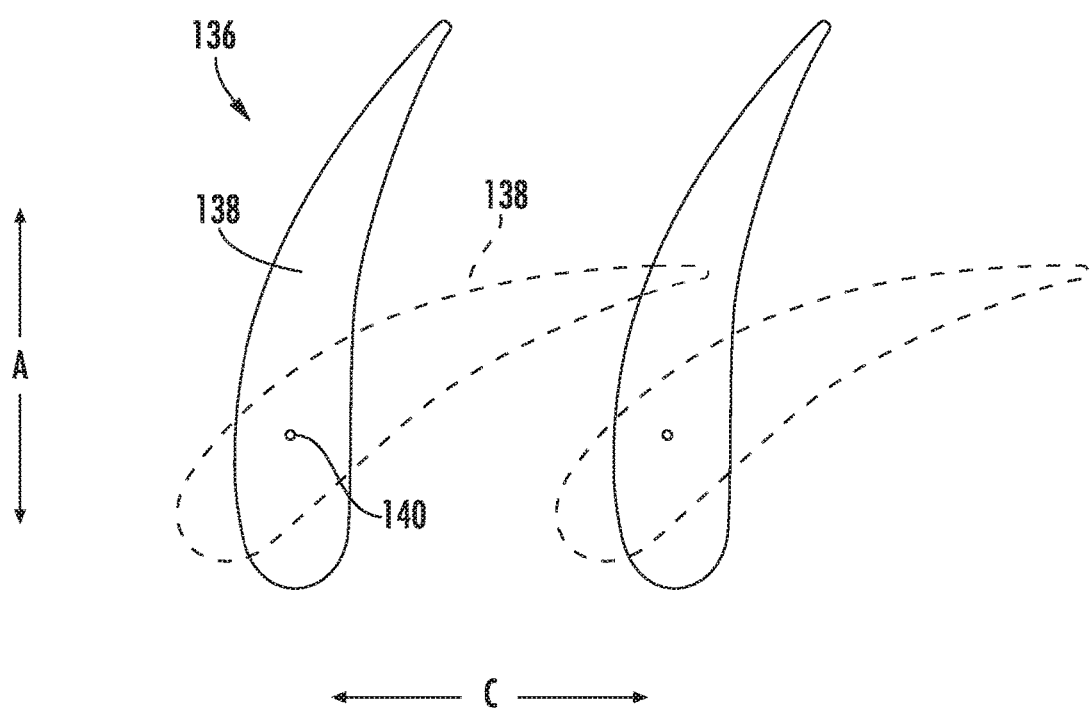
FIG. 4 is a schematic view of a plurality of variable guide vanes in accordance with an exemplary embodiment of the present disclosure.

Referring now also briefly to FIG. 4, providing a radial, cross-sectional view of a plurality of variable guide vanes 138 of the stage of variable guide vanes 136, it will be appreciated that the stage of variable guide vanes 136 is movable between an open position (depicted) and a closed position (depicted in phantom). More specifically, for the embodiment depicted each variable guide vane 138 in the stage of variable guide vanes 136 is movable about an axis 140 between the open position (depicted) and the closed position (depicted in phantom). In the open position, as shown, the stage a variable guide vanes is configured to allow a maximum amount of airflow 134 through the thermal management duct flowpath 126. By contrast, when the stage of variable guide vanes 136 is in the closed position, as shown in phantom, the stage of variable guide vanes 136 is configured to minimize an amount of airflow 134 through the thermal management duct flowpath 126. Additionally, the stage of variable guide vanes 136 may be movable to various intermediate positions between the first and second positions to, e.g., modulate an inlet flow area, and/or modify a swirl of the airflow 134 through the thermal management duct flowpath 126 or otherwise change an airflow direction of the airflow 134 through the thermal management duct flowpath 126.

Notably, it will be appreciated that for the embodiment shown, the thermal management duct assembly 124 may be configured to route a relatively large portion of the airflow 64 through the core air flowpath 37 to the thermal management duct flowpath 126. For example, in certain exemplary embodiments, the ratio of airflow 134 through the thermal management duct flowpath 126 to airflow 64 through the core air flowpath 37 may be between about 0.01:1 and about 0.4:1, such as between about 0.05:1 and about 0.30:1, such as between about 0.05:1 and about 0.20:1. For the purposes of determining this ratio, the amount of airflow 64 through the core air flowpath 37 is an amount of airflow through the core air flowpath 37 at a location immediately downstream of the inlet 128 to the thermal management duct flowpath 126 (provided the inlet 128 to the thermal management duct flowpath 126 is in airflow communication with the core air flowpath 37; otherwise the amount of airflow through the core air flowpath 37 refers to the amount of airflow 64 through the inlet 20 of the turbomachine 16).

Accordingly, it will be appreciated that for certain exemplary aspects, the stage of variable guide vanes 136 may be moved between the open position and the closed position based at least in part on a need for heat rejection of the thermal management system 100.

Figure 5:
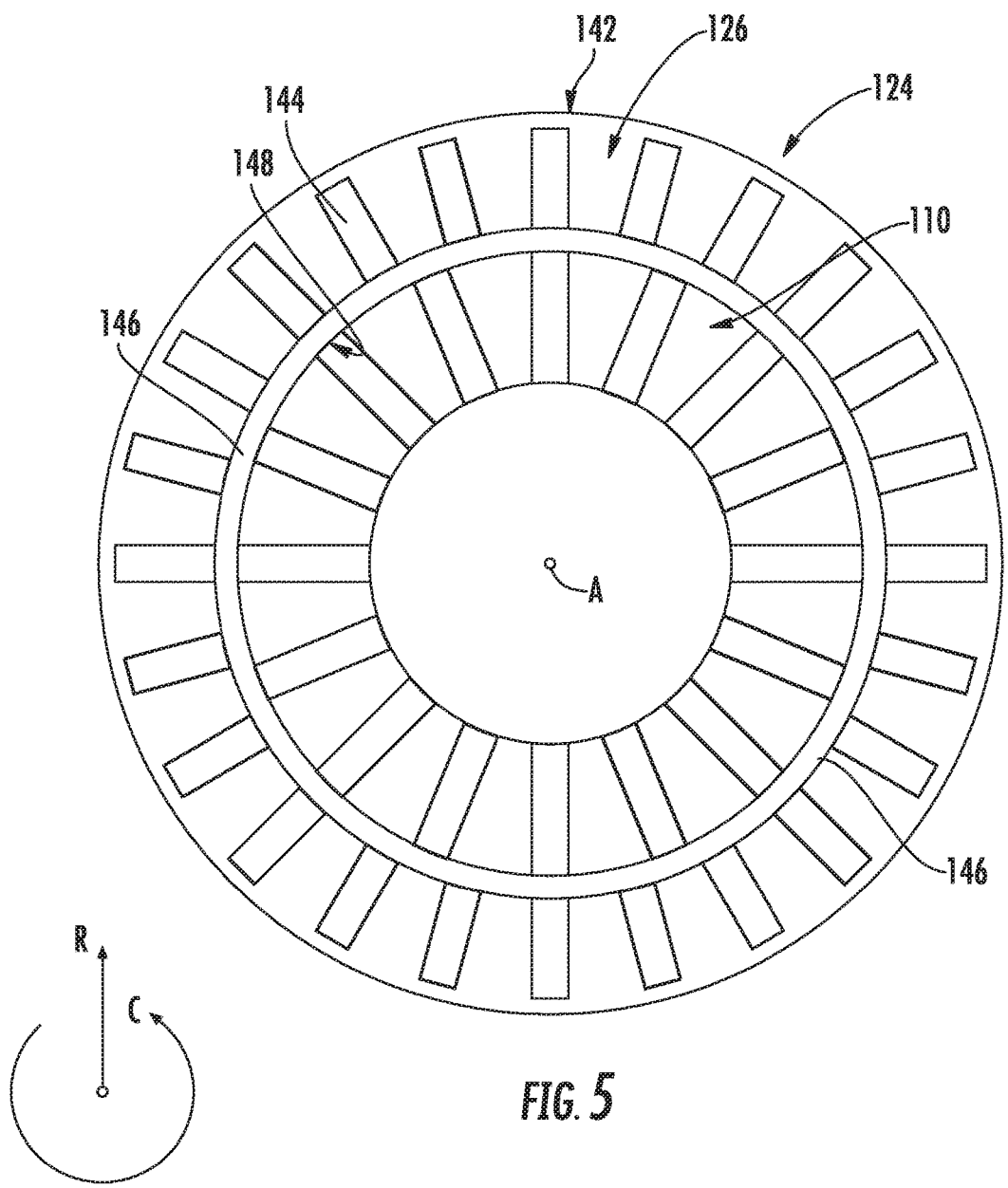
FIG. 5 is an axial, schematic view of an auxiliary fan in accordance with an exemplary embodiment of the present disclosure.

Referring still to FIG. 3, and now also to FIG. 5, the thermal management duct assembly 124 further comprises an auxiliary fan 142. FIG. 5 provides an axial view of the LP compressor 22 of the turbomachine 16 and the auxiliary fan 142 of the thermal management duct assembly 124. As is depicted in FIGS. 3 and 5, the auxiliary fan 142 of the thermal management duct assembly 124 is coupled to the LP spool 36 through the LP compressor 22. Additionally, the auxiliary fan 142 of the thermal management duct assembly 124 is positioned outward of a stage 110 of compressor rotor blades of the compressor along the radial direction R, and more specifically, is positioned outward of the forward-most stage 110 of LP compressor rotor blades of the LP compressor 22 along the radial direction R. Notably, as is depicted in FIG. 5, and as will be appreciated, the thermal management duct flowpath 126 defined by the thermal management duct assembly 124 is a substantially annular flowpath position outward of the core air flowpath 37 along the radial direction R.

As is depicted schematically in FIGS. 3 and 5, the auxiliary fan 142 includes a stage of auxiliary fan blades 144 attached to a solid ring 146. The solid ring 146 is in turn attached to a radially outer end 148 of the LP compressor rotor blades of the stage 110 of LP compressor rotor blades and it is rotatable with (and driven by) the stage 110 of LP compressor rotor blades. The auxiliary fan 142 may be configured to increase a pressure of the flow of the airflow through the through the thermal management duct flowpath 126 during operation.

As stated, for the embodiment depicted the auxiliary fan 142 is coupled to a first, forward-most stage 110 of LP compressor rotor blades of the LP compressor 22. It will be appreciated, however, that in other exemplary embodiments, the auxiliary fan 142 may instead be coupled to any other suitable stage 110 of LP compressor rotor blades (or to a stage of rotor blades of another compressor if/when the thermal management duct assembly 124 is positioned elsewhere). Additionally, or alternatively, in other exemplary embodiments, the auxiliary fan 142 may be configured as an extension of one or more stages of the LP compressor 22. For example, in certain exemplary embodiments, the forward-most stage 110 of LP compressor rotor blades of the LP compressor 22 may extend into the thermal management duct flowpath 126 and function in the same manner as the exemplary fan blades 144 of the exemplary auxiliary fan 142 depicted in FIGS. 3 and 5. Such a configuration may be similar to, e.g., a part-span shroud.

Figure 6:
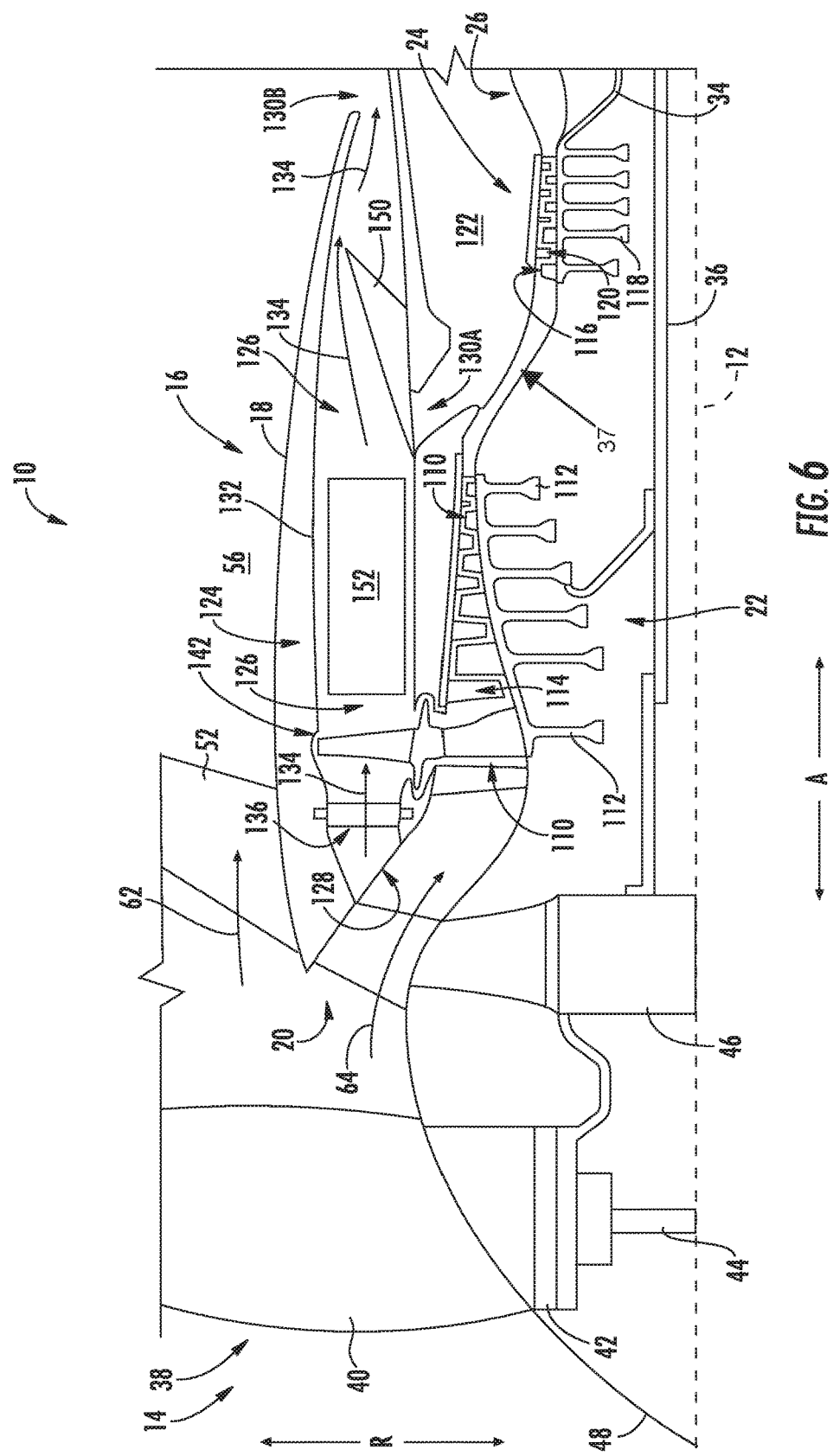
FIG. 6 is a schematic, cross-sectional view of a section of a gas turbine engine including a thermal management system in accordance with another exemplary embodiment of the present disclosure.

Referring again to FIG. 3, and now also to FIG. 6, it will be appreciated that the outlet 130 of the thermal management duct flowpath 126 of the thermal management duct assembly 124 is selectively in airflow communication with the core compartment 122 defined by the turbomachine 16. More specifically, for the embodiment depicted the outlet 130 of the thermal management duct flowpath 126 is a first outlet 130A and the thermal management duct flowpath 126 further includes a second outlet 130B, with the second outlet 130B selectively in airflow communication with the bypass airflow passage 56.

In order to provide such selective airflow communication between the thermal management duct flowpath 126 and the core compartment 122 and bypass airflow passage 56, the thermal management duct assembly 124 further includes a variable component 150 movable between a first position and a second position. FIG. 3 depicts the variable component 150 in the first position and FIG. 6 depicts the variable component 150 in the second position. As is depicted, the variable component 150 is movable generally along the axial direction A between the first position and second position. For example, in certain embodiments, the variable component 150 may be referred to as a sled door, movable along a track using and actuation member (not shown) along the axial direction A between the first position and the second position.

As is depicted, when the variable component 150 is in the first position (FIG. 3), the first outlet 130A is in airflow communication with the core compartment 122 through the first outlet 130A. By contrast, when the variable component 150 is in the second position (FIG. 6), the thermal management duct flowpath 126 is in airflow communication with the bypass airflow passage 56 through the second outlet 130B. More specifically, when the variable component 150 is in the first position, substantially all of the airflow 134 through the thermal management duct flowpath 126 is configured to exit the thermal management duct flowpath 126 through the first outlet 130A. By contrast, when the variable component 150 is in the second position, substantially all of the airflow 134 through the thermal management duct flowpath 126 is configured to exit the thermal management duct flowpath 126 through the second outlet 130B.

Notably, in certain exemplary embodiment, the variable component 150 may additionally, or alternatively, be movable to one or more intermediate positions between the first position and the second position to vary a ratio of the airflow 134 exiting the thermal management duct flowpath 126 from the first outlet 130A and the second outlet 130B.

Moreover, it should be appreciated that in other exemplary embodiments, any other suitable configuration may be provided for having the thermal management duct flowpath 126 be selectively in airflow communication with the core compartment 122 and/or bypass airflow passage 56 through the first outlet 130A and second outlet 130B, respectively. For example, in other embodiments, the thermal management duct assembly 124 may include separate blocker doors independently actuatable between open and closed positions to allow or block the airflow 134 from the thermal management duct flowpath 126 to the core compartment 122 and/or bypass airflow passage 56. Additionally, or alternatively, in other embodiments, the outer casing 18 may include a flap (e.g. aileron) that restricts an airflow 34 from flowing therethrough, resulting in a diverted airflow into the core compartment 122 through passage 130A. Other configurations are contemplated as well.

Referring still to FIGS. 3 and 6, it will be appreciated that the turbomachine 16 further includes a heat sink heat exchanger 152. More specifically, as previously noted, the gas turbine engine includes the thermal management system 100, with the thermal management system 100 including the heat sink heat exchanger 152, which is positioned within the turbomachine 16.

As is depicted, the heat sink heat exchanger 152 is positioned in thermal communication with the thermal management duct flowpath 126 for transferring heat to the airflow 134 through the thermal management duct flowpath 126 during operation. More specifically, for the embodiment depicted, the heat sink heat exchanger 152 is positioned within the thermal management duct flowpath 126 to transfer heat to the airflow 134 through the thermal management duct flowpath 126 during operation. In certain embodiments, the heat sink heat exchanger 152 may be, e.g., the exemplary heat sink heat exchanger 108 of the thermal management system 100 described above with reference to FIG. 2. In such a manner, the heat sink heat exchanger 152 may be thermally coupled to at least one of a cooled cooling air system (e.g., system 80) of the gas turbine engine, an auxiliary system of the gas turbine engine (such as an electronics cooling system 88 and/or an environmental control system 86), or a lubrication system (e.g., system 78) of the gas turbine engine through the thermal management system 100 (exemplary systems 78, 80, 86, and 88 depicted in FIG. 1 and described above).

Figure 7:
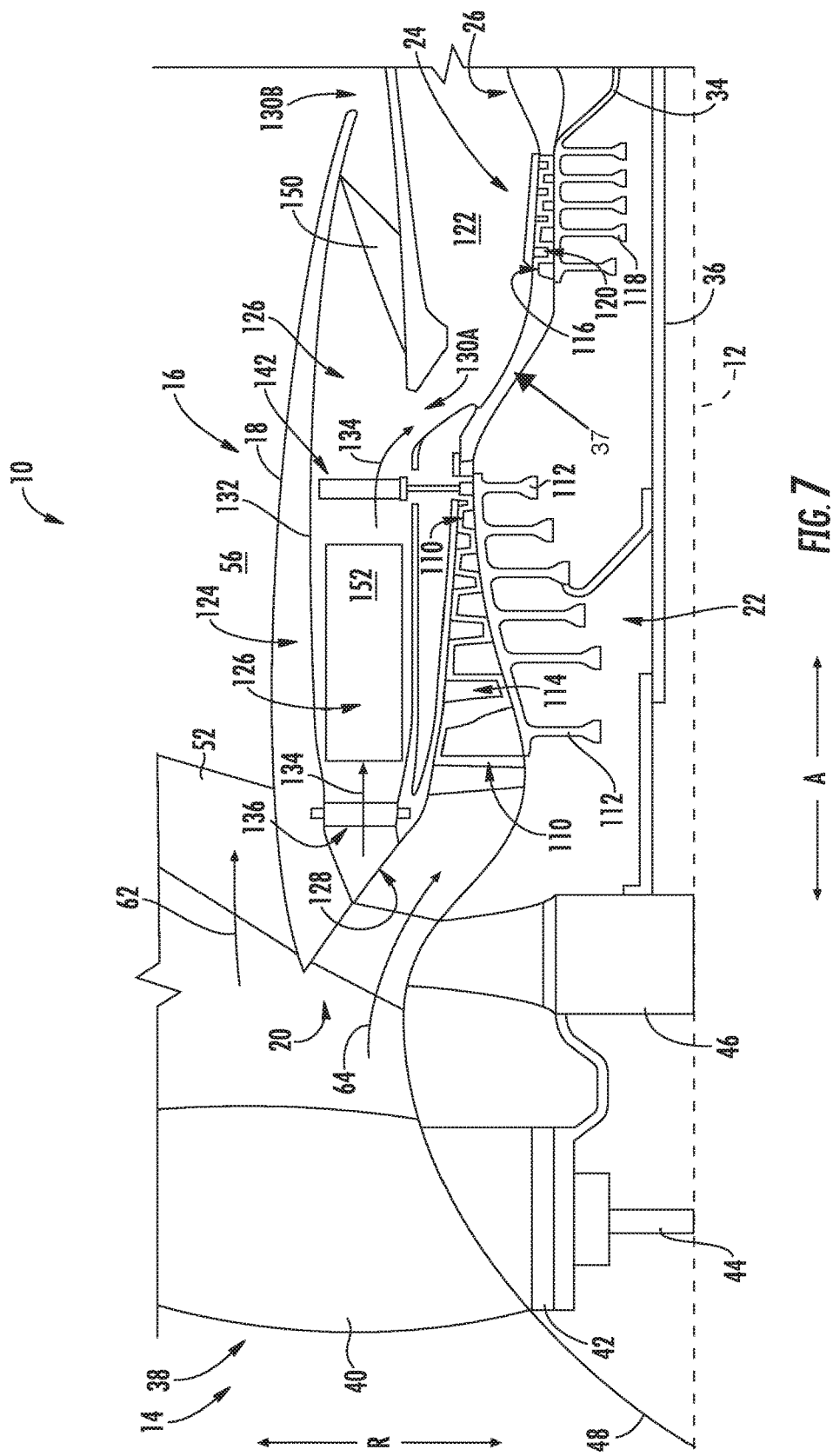
FIG. 7 is a schematic, cross-sectional view of a section of a gas turbine engine including a thermal management system in accordance with yet another exemplary embodiment of the present disclosure.

Moreover, for the embodiment depicted, the heat sink heat exchanger 152 is located downstream of the stage of inlet guide vanes 136 and auxiliary fan 142, and upstream of the variable geometry component 150. With such a configuration, the heat sink heat exchanger 152 may act as a de-swirler for the auxiliary fan 142 (i.e., de-swirls the airflow 134 from the fan 142). It will be appreciated, however, that in other exemplary embodiments, these various components of the thermal management duct assembly 124 may instead be arranged in any other suitable order. For example, referring briefly to FIG. 7, a schematic, cross-sectional view of a section of a gas turbine engine including a thermal management system in accordance with another exemplary embodiment of the present disclosure is provided. The exemplary gas turbine engine of FIG. 7 may be configured in substantially the same manner as exemplary gas turbine engine of FIGS. 3 and 6. However, for the exemplary embodiment of FIG. 7, the heat sink heat exchanger 152 is instead positioned upstream of the auxiliary fan 142. In such a manner, the heat sink heat exchanger 152 may act as a foreign debris screen for the auxiliary fan 142. Additionally, with such an exemplary aspect, the auxiliary fan 142 is coupled to, and driven by, an aft-most stage 110 of the LP compressor rotor blades of the LP compressor 22. Notably, with such an embodiment, the variable geometry component 150 may act as a de-swirler for the auxiliary fan 142 when such airflow 134 is provided to the bypass airflow passage 56 (notably, it may be beneficial to swirl the airflow 134 to the core compartment 122 to get more even flow distribution and use of available flow energy). Accordingly, for example, in certain exemplary embodiments, the variable geometry component 150 may include vanes or other de-swirling features to provide such a benefit.

Referring now back to FIGS. 3 and 6, when the exemplary thermal management system 100 including the heat sink heat exchanger 152 depicted is configured in a similar manner as exemplary thermal management system 100 of FIG. 2, the heat sink heat exchanger 152 may be a "liquid-to-air" heat exchanger (i.e., a thermal bus fluid-to-air heat exchanger). However, as discussed above, in other embodiments the thermal management system 100 of FIG. 2 may include any other suitable type of heat exchange fluid (e.g., gas, liquid/gas mixture, supercritical gas), and/or the thermal management system 100 may be configured in any other suitable manner. Accordingly, in other embodiments, the heat sink heat exchanger 152 may instead be, e.g., an "air-to-air" heat exchanger configured to exchange heat with, or rather, to provide heat to, another airflow. For example, in certain embodiments, heat sink heat exchanger 152 may be configured to provide heat from a bleed air from the HP compressor 24 (e.g., as part of a cooled cooling air system, such as system 80) to the airflow 134 through the thermal management duct flowpath 126.

It should further be appreciated that enabling the heat sink heat exchanger 152 to effectively transfer heat to the airflow 134 through the thermal management duct flowpath 126 is a primary function of the thermal management duct assembly 124. Therefore, the thermal management duct assembly 124 may be referred to as a "dedicated" thermal management duct assembly 124 for the thermal management system 100.

Further, it will be appreciated that although the airflow 134 through the thermal management duct flowpath 126 accepts heat from the heat sink heat exchanger 152, the airflow 134 downstream of the heat sink heat exchanger 152 may still be at a low temperature relative to other components of the turbomachine 16. Accordingly, providing such airflow 134 through the first outlet 130A to the core compartment 122 may allow for such airflow 134 to cool certain components of the turbomachine 16 exposed to the core compartment 122. Specifically, providing the airflow 134 through the first outlet 130A to the core compartment 122 may allow for the airflow 134 to cool aspects of the HP compressor 24, the combustion section 26, etc. Accordingly, during certain high-power operating conditions, such as takeoff operating conditions, climb operating conditions, etc., the variable component 150 may be moved to the first position (FIG. 3) to allow substantially all of the airflow 134 through the thermal management duct flowpath 126 to be provided to the core compartment 122 to cool one or more components expose thereto.

It will also be appreciated that providing the airflow 134 from the thermal management duct flowpath 126 through the second outlet 130B to the bypass airflow passage 56 may increase a thrust production of the gas turbine engine by adding energy to the bypass airflow passage 56. Accordingly, during certain engine operations in which additional cooling of the core compartment 122 is not necessary, such as during certain relatively low power operating conditions, e.g., cruise operating conditions and idle operating conditions, the variable component 150 may be moved to the second position (FIG. 6) to duct the airflow 134 through the thermal management duct flowpath 126 to the bypass airflow passage 56 to increase an overall efficiency of the gas turbine engine.

Such a configuration may increase an overall efficiency of a gas turbine engine, such as a turbofan engine, and in particular may allow for efficiently rejecting a relatively large amount of heat without requiring a large, potentially disruptive heat exchanger in a bypass airflow passage of the gas turbine engine. More specifically, by positioning the heat sink heat exchanger in a dedicated thermal management duct flowpath within a turbomachine of the gas turbine engine, a relatively large amount of heat may be rejected without requiring the potentially disruptive heat sink heat exchanger positioned within, or integrated into one or more components within, the bypass airflow passage.

It should be appreciated, however, that in other exemplary embodiments, the thermal management duct assembly may have any other suitable configuration, such that the thermal management duct flowpath extends between any other suitable locations within the turbomachine. For example, in other exemplary embodiments, an inlet of the thermal management duct flowpath may be positioned at any other suitable location (such as at a location directly in airflow communication with the bypass airflow passage, axially aligned with the inlet to the turbomachine, positioned downstream of the LP compressor and upstream of the HP compressor, etc.). Further, in still other embodiments, an outlet, and more specifically, a first outlet, may also be positioned at any other suitable location and configured to provide airflow to any other compartment within the turbomachine. Moreover, in other exemplary embodiments, the thermal management duct assembly may include any other components not described herein, or alternatively, may not include each of the components described herein. For example, in other exemplary embodiments, the thermal management duct assembly may not include the stage variable guide vanes, or alternatively, may not include the variable component movable between the first and second positions.

Figure 8:
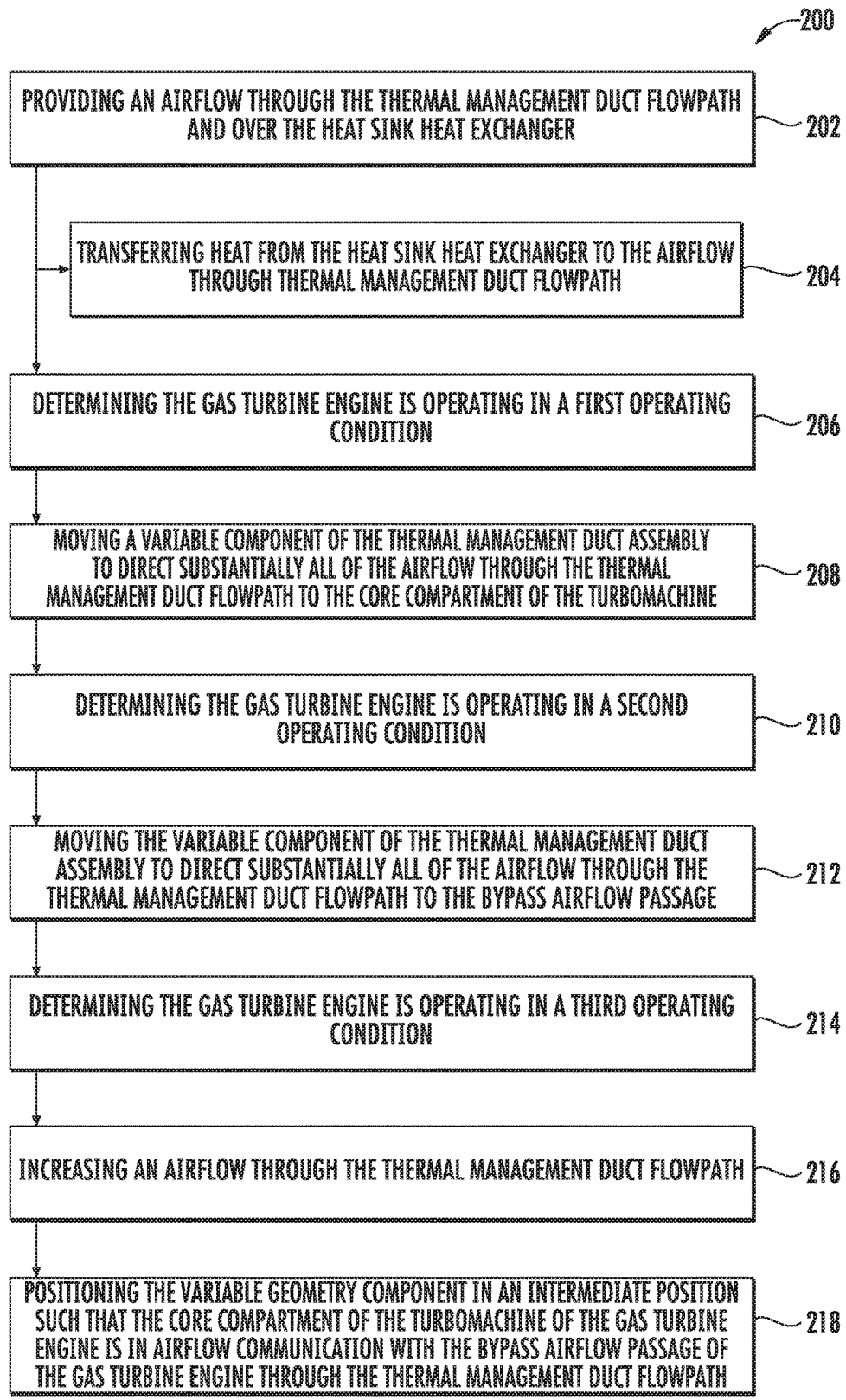
FIG. 8 is a flowchart of a method for operating a gas turbine engine in accordance with an exemplary aspect of the present disclosure.

Referring now to FIG. 8, a flowchart of a method 200 for operating a gas turbine engine in accordance with an exemplary aspect of the present disclosure is provided. The gas turbine engine may be configured in accordance with one or more of the exemplary embodiments described above with reference to FIGS. 1 through 6. Accordingly, the gas turbine engine may generally include a fan, a turbomachine, and an outer nacelle defining a bypass airflow passage with the turbomachine. The turbomachine may define a core compartment and include a heat sink heat exchanger and a thermal management duct assembly. The thermal management duct assembly may define a thermal management duct flowpath, with the heat sink heat exchanger in thermal communication with the thermal management duct flowpath.

As is depicted in FIG. 8, the method 200 generally includes at (202) providing an airflow through the thermal management duct flowpath and over the heat sink heat exchanger. Providing the airflow through the thermal management duct flowpath and over the heat sink heat exchanger at (202) may include at (204) transferring heat from the heat sink heat exchanger to the airflow through thermal management duct flowpath.

The method 200 also includes at (206) determining the gas turbine engine is operating in a first operating condition and at (208) moving a variable component of the thermal management duct assembly to direct substantially all of the airflow through the thermal management duct flowpath to the core compartment of the turbomachine. More specifically, for the exemplary aspect depicted, moving the variable component of the thermal management duct assembly to direct substantially all of the airflow through the thermal management duct flowpath to the core compartment at (208) includes moving the variable component of the thermal management duct assembly in response to determining the gas turbine engine is operating in the first operating condition at (206). Notably, in certain exemplary aspects, the first operating condition may be a high-power operating condition, such as a takeoff operating condition or a climb operating condition. In such a manner, the airflow provided to the core compartment of the turbomachine may provide cooling to one or more components of the turbomachine exposed to the core compartment.

The method 200 further includes at (210) determining the gas turbine engine is operating in a second operating condition, and at (212) moving the variable component of the thermal management duct assembly to direct substantially a predetermined amount of the airflow through the thermal management duct flowpath to the bypass airflow passage. More specifically, moving the variable component of the thermal management duct assembly to direct substantially a predetermined amount of the airflow through the thermal management duct flowpath to the bypass airflow passage at (212) includes moving the variable component of the thermal management duct assembly in response to determining the gas turbine engine is operating in the second operating condition at (210). In certain aspects, the predetermined amount may be substantially all of the airflow through the thermal management duct flowpath, or alternatively, may be some in between amount determined to provide a minimum amount of cooling necessary for the core compartment of the turbomachine, while providing the remaining portion to the bypass airflow passage.

Notably, in certain exemplary aspects, the second operating condition may be a low-power operating condition (i.e., a low-power operating condition relative to the high-power operating condition), such as a cruise operating condition or an idle operating condition. In such a manner, the method 200 may increase an overall efficiency of the gas turbine engine by adding energy to the bypass airflow passage (i.e., increasing an amount of thrust generation) when cooling components exposed the core compartment is not needed.

Moreover, will be appreciated that in at least certain exemplary embodiments, the thermal management duct assembly may further include one or more components for varying an amount of airflow through the thermal management duct flowpath. For example, the exemplary thermal management duct assembly may further include a stage of variable guide vanes, an auxiliary fan, or both. It will also be appreciated that the variable geometry component may be utilized to vary the amount of airflow through the thermal management duct flowpath.

With such an exemplary aspect, the method 200 further includes at (214) determining the gas turbine engine is operating in a third operating condition. The third operating condition may be a transient operating condition (i.e., an operating condition transitioning from a relatively high-power operating mode to a relatively low-power operating mode, or vice versa). Further, the method 200 includes at (216) increasing an airflow through the thermal management duct flowpath, or more specifically, increasing a ratio of airflow through the thermal management duct flowpath to an airflow through a core air flowpath of the gas turbine engine. For example, increasing the airflow through thermal management duct flowpath at (216) may effectively include bleeding an airflow through the core air flowpath. Notably, in certain exemplary aspects, increasing the airflow through the thermal management duct flowpath at (216) may include increasing the airflow through the thermal management duct flowpath in response to determining the gas turbine engine is operating in the third operating condition at (214). Further, still, in certain exemplary aspects, increasing the airflow through the thermal management duct flowpath at (216) may include one or more of moving the variable geometry component of the thermal management duct assembly, changing a pitch angle of the stage of inlet guide vanes of the thermal measure duct assembly, and/or changing a pitch angle of a plurality of fan blades of the auxiliary fan of the thermal management duct assembly.

Referring still to FIG. 8, the method 200 may additionally include aspects for assisting with a shutdown of the gas turbine engine. More specifically, as is depicted, the method 200 further includes at (218) positioning the variable geometry component in an intermediate position such that the core compartment of the turbomachine of the gas turbine engine is in airflow communication with the bypass airflow passage of the gas turbine engine through, in at least certain exemplary aspects, the thermal management duct flowpath. Positioning the variable geometry component in the intermediate position (218) may allow for relatively hot undercowl air within the turbomachine to vent to an ambient location (i.e., through the thermal management duct flowpath and bypass airflow passage) during engine shutdown condition without requiring one or more rotors of the turbomachine to be rotated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and comprising:
    an outer nacelle;
    a fan at least partially surrounded by the outer nacelle; and
    a turbomachine drivingly coupled to the fan and at least partially surrounded by the outer nacelle, the outer nacelle defining a bypass airflow passage with the turbomachine, the turbomachine comprising
        a compressor section defining in part a core air flowpath, the turbomachine further defining a core compartment outward of the core air flowpath along the radial direction;
        a heat sink heat exchanger; and
        a thermal management duct assembly defining a thermal management duct flowpath extending between an inlet and an outlet and positioned between the core air flowpath and the bypass airflow passage along the radial direction, the outlet selectively in airflow communication with the core compartment, and the heat sink heat exchanger positioned in thermal communication with the thermal management duct flowpath for transferring heat to an airflow through the thermal management duct flowpath during operation.

2. The gas turbine engine of claim 1, wherein the compressor section of the turbomachine comprises a compressor, wherein the inlet of the thermal management duct flowpath is in airflow communication with the core air flowpath at a location upstream of the compressor.

3. The gas turbine engine of claim 2, wherein the compressor is a low pressure compressor, wherein the compressor section further comprises a high pressure compressor, and wherein the core compartment surrounds at least a portion of the high pressure compressor.

4. The gas turbine engine of claim 1, wherein the compressor section of the turbomachine comprises a compressor having a stage of compressor rotor blades, and wherein the thermal management duct assembly comprises an auxiliary fan driven by the stage of compressor rotor blades of the compressor.

5. The gas turbine engine of claim 4, wherein the auxiliary fan of the thermal management duct assembly is positioned outward of the stage of compressor rotor blades of the compressor along the radial direction.

6. The gas turbine engine of claim 1, wherein the thermal management duct assembly further comprises a stage of variable guide vanes positioned within the thermal management duct flowpath.

7. The gas turbine engine of claim 6, wherein the stage of variable guide vanes is movable between an open position and a closed position.

8. The gas turbine engine of claim 1, wherein the outlet of the thermal management duct flowpath is a first outlet, wherein the thermal management duct flowpath further includes a second outlet selectively in airflow communication with the bypass airflow passage.

9. The gas turbine engine of claim 8, wherein the thermal management duct assembly further comprises a variable component movable between a first position and a second position, wherein the thermal management duct flowpath is in airflow communication with the core compartment through the first outlet when the variable component is in the first position, and wherein the thermal management duct flowpath is in airflow communication with the bypass airflow passage through the second outlet when the variable component is in the second position.

10. The gas turbine engine of claim 9, wherein the gas turbine engine further defines an axial direction, and wherein the variable component is movable generally along the axial direction between the first position and the second position.

11. The gas turbine engine of claim 9, wherein substantially all of an airflow through the thermal management duct flowpath is configured to exit through the first outlet when the variable component is in the first position, and wherein substantially all of the airflow through the thermal management duct flowpath is configured to exit through the second outlet when the variable component is in the second position.

12. The gas turbine engine of claim 1, further comprising:
    a cooled cooling air system;
    an auxiliary system;
    an environmental control system; and
    a lubrication system, and wherein the heat sink heat exchanger is in thermal communication with at least one of the cooled cooling air system, the auxiliary system, the environmental control system, or the lubrication system through the thermal management system.

13. The gas turbine engine of claim 1, wherein the gas turbine engine is a high-bypass turbofan engine defining a bypass ratio greater than about 6:1 and up to about 30:1.

14. The gas turbine engine of claim 1, wherein the thermal management duct flowpath is a substantially annular flowpath positioned outward of the core air flowpath along the radial direction.

15. The gas turbine engine of claim 1, wherein the turbomachine defines a ratio of airflow through the thermal management duct flowpath to airflow through the core air flowpath between about 0.01:1 and 0.4:1.

16. A method for operating a gas turbine engine having a fan, a turbomachine, and an outer nacelle defining a bypass airflow passage with the turbomachine, the turbomachine defining a core compartment and comprising a heat sink heat exchanger and a thermal management duct assembly, the thermal management duct assembly defining a thermal management duct flowpath, the heat sink heat exchanger in thermal communication with the thermal management duct flowpath, the method comprising:
    providing an airflow through the thermal management duct flowpath and over the heat sink heat exchanger;
    determining the gas turbine engine is operating in a first operating condition;
    moving a variable component of the thermal management duct assembly to direct substantially all of the airflow through thermal management duct flowpath to the core compartment;

determining the gas turbine engine is operating in a second operating condition; and moving the variable component of the thermal management duct assembly to direct substantially a predetermined amount of the airflow through the thermal management duct flowpath to the bypass airflow passage.

17. The method of claim 16, wherein the first operating condition is a high power operating condition.

18. The method of claim 17, wherein the second operating condition is a low power operating condition.

19. The method of claim 16, wherein the compressor section of the turbomachine comprises a compressor, wherein the inlet of the thermal management duct flowpath is in airflow communication with the core air flowpath at a location upstream of the compressor.

20. The method of claim 16, wherein the thermal management duct flowpath is a substantially annular flowpath positioned outward of the core air flowpath along the radial direction and inward of the bypass airflow passage along the radial direction.

* * * * *